(12) United States Patent
Mandelli (10) Patent No.: US 9,964,450 B2
(45) Date of Patent: May 8, 2018

(54) CHEMICAL COMPOSITION SENSITIVE TO TEMPERATURE VARIATIONS AND METHOD OF PRODUCTION AND USE THEREOF

(71) Applicant: Marco Mandelli, Trento (IT)

(72) Inventor: Marco Mandelli, Trento (IT)

(*) Notice: Subject to any disclaimer, the term of this patent is extended or adjusted under 35 U.S.C. 154(b) by 603 days.

(21) Appl. No.: 14/415,045

(22) PCT Filed: Aug. 8, 2013

(86) PCT No.: PCT/IB2013/056493
§ 371 (c)(1),
(2) Date: Jan. 15, 2015

(87) PCT Pub. No.: WO2014/024162
PCT Pub. Date: Feb. 13, 2014

(65) Prior Publication Data
US 2015/0168224 A1    Jun. 18, 2015

(30) Foreign Application Priority Data

Aug. 10, 2012  (IT) .............................. VR2012A0168

(51) Int. Cl.
*C09D 11/00*   (2014.01)
*H01F 1/00*   (2006.01)
(Continued)

(52) U.S. Cl.
CPC ............... *G01K 3/04* (2013.01); *C09D 5/23* (2013.01); *C09D 11/03* (2013.01); *C09D 11/037* (2013.01);
(Continued)

(58) Field of Classification Search
CPC ..... H01F 1/0054; H01F 1/0063; C09D 11/03; C09D 5/23; G01K 7/36; G01K 7/38
See application file for complete search history.

(56) References Cited

FOREIGN PATENT DOCUMENTS

JP        2005-139008       6/2005
WO   WO 2006/057467 A1    6/2006
(Continued)

OTHER PUBLICATIONS

International Search Report dated Dec. 4, 2013 issued in corresponding International patent application No. PCT/IB2013/056493.

*Primary Examiner* — C Melissa Koslow
(74) *Attorney, Agent, or Firm* — Ostrolenk Faber LLP (57) ABSTRACT

A magnetizable chemical composition including at least one polar solvent (4) selected from the group comprising an alcohol with a number of carbon atoms from C8 to C14, polytetrahydrofuran, or a mixture thereof; a ferromagnetic component, including a plurality of magnetizable particles (1) of Stable Single Domain (SSD) type selected from the group comprising magnetite, substituted magnetite and/or ferrite in an amount from 5 to 15% by volume of solvent and having a diameter from about 20 nm to 50 nm; and a polymer component (2) including polyvinyl butyral (PVB) or polyvinyl butyral-vinyl alcohol-vinyl acetate copolymer in a percentage from 3 to 15% by volume of solvent, the polymeric component being shaped as a net or mesh and delimiting a plurality of housing cells or zones (3), in each of which one of said particles (1) is housed immersed in the polar solvent (4). A method of obtaining such a composition, a microcapsule comprising the composition, an ink comprising the microcapsules and a method of testing a product marked with such ink.

14 Claims, 10 Drawing Sheets

(51) Int. Cl.
*G01K 11/14* (2006.01)
*G01K 3/04* (2006.01)
*G01K 7/38* (2006.01)
*C09D 11/03* (2014.01)
*C09D 5/23* (2006.01)
*C09D 11/037* (2014.01)
*C09D 11/50* (2014.01)
*G01K 7/36* (2006.01)
*H01F 1/01* (2006.01)

(52) U.S. Cl.
CPC ............... *C09D 11/50* (2013.01); *G01K 7/36* (2013.01); *G01K 7/38* (2013.01); *G01K 11/14* (2013.01); *H01F 1/0054* (2013.01); *H01F 1/0063* (2013.01); *H01F 1/01* (2013.01)

(56) References Cited

FOREIGN PATENT DOCUMENTS

WO   WO 2011/061701   \*   5/2011
WO   WO 2011/061701 A2   5/2011

\* cited by examiner

CHEMICAL COMPOSITION SENSITIVE TO TEMPERATURE VARIATIONS AND METHOD OF PRODUCTION AND USE THEREOF

CROSS REFERENCE TO RELATED APPLICATIONS

The present application is a 35 U.S.C. § 371 National Phase conversion of PCT/IB2013/056493, filed Aug. 8, 2013, which claims benefit of Italian Application No. VR2012A000168, filed Aug. 10, 2012, the disclosure of which is incorporated herein by reference. The PCT International Application was published in the English language.

TECHNICAL FIELD OF THE INVENTION

The present invention regards a chemical composition sensitive to temperature, particularly suitable for obtaining a sensor for testing the correct preservation of products, such as drugs and foods that require being constantly maintained at low temperature.

BACKGROUND OF THE INVENTION

As is known, the temperature during the various steps of processing, preserving and distribution of food products, drugs and the like (particularly those of the so-called "cold chain") must be suitably controlled, since specific production specifications and rules of law establish specific temperature ranges for such steps, in order to ensure the quality and/or safety of the products.

For such purpose, it must be recalled that:
the "refrigeration" of a product, for example a food product, consists of its cooling and maintenance at a temperature typically from −1° C. to +8° C.; and
the "freezing" of a product corresponds with the cooling and maintenance of the product at temperatures lower than −18° C.

Naturally, freezing slows, to a greater extent, the biochemical reactions that can cause the alteration of the products, with the consequence that the shelf-life of frozen products is longer, even though also in the presence of freezing temperatures several physical-mechanical changes can occur along with several biochemical reactions. In particular, this can occur in the cases where an even only temporary increase of the temperature takes place, e.g. to a level higher than −18° C.

It is therefore important to be able to control the temperature of a product to be preserved during the entire cold chain.

A solution known on the market for controlling the temperature of products, particularly refrigerated or frozen, is constituted by the so-called "thermochromic labels". These are adhesive labels applicable to products to be monitored, including substances that irreversibly change color when their temperature—and thus that of the product to which they are applied—exceeds a certain threshold value.

Such labels, which must be preserved at temperatures lower than the respective threshold temperature, at which they change color, are disposable and are very costly.

Thermochromic labels are therefore not capable of giving information regarding the time interval of exposure of the respective product to temperatures higher than the threshold temperature.

The international application PCT/IB2010/055254 in the name of the applicant of the present patent application teaches a composition or suspension comprising a mixture of fatty alcohols, magnetite and polyvinylpyrrolidone (PVP) or polystyrene copolymer (PVP-PS copolymer) for producing a microencapsulated ink (obtained by mixing microcapsules containing the abovementioned magnetic suspension with a "base" for flexographic inks or serigraphic inks with UV crosslinking). The composition according to such international application has a number of drawbacks, and more particularly:
a "pasty" appearance;
a significant decrease over time of the sensitivity, caused by the partial incapacity of the PVP network to stabilize the nanoparticles of magnetite, which after a certain time period are progressively agglomerated together and can no longer be demagnetized due to the Brownian mechanism, which as is known only affects isolated SD (single domain) particles.

The first of these problems negatively affects the microencapsulation: for the obtainment thereof, it is necessary to emulsify the hydrophobic fluid to be encapsulated. It will be understood that a pasty material is very difficult to disperse, unlike a fluid with low viscosity that tends to separate itself in the form of micro-droplets when stirred in the encapsulation liquid.

In addition, due to the affinity of water and the PVP, the encapsulation yield according to the method taught in the international application PCT/182010/055254 is low.

Due to the second problem or drawback, the composition that is the subject matter of the international application PCT/IB2010/055254 does not ensure constant performances over time. More particularly, if the composition is used for obtaining a sensor, if the latter is preserved for a long time above the threshold temperature (TTH) before being used, the composition tends to lose sensitivity over time.

The international application PCT/KR2004/003090 concerns nanoparticles obtained from a solution of a metallic salt of a surfactant in a suitable solvent, which yields, in that solvent, to a metallic-surfactant complex. The application is about a method for preparing nanoparticles, which, at the end of the method, are separated from a parent liquid. In PCT/KR2004/003090 no teaching of the use of PVB in the preparation of nanoparticles is disclosed.

SUMMARY OF THE INVENTION

An object of the present invention is therefore to provide a new chemical composition sensitive to temperature variations.

Another object of the present invention is to provide a chemical composition that is not pasty and whose sensitivity does not decrease or does not rapidly decrease over time.

Another object of the present invention is to provide a method of production/use of the composition according to the invention.

Another object of the present invention is to provide a sensor for testing the correct preservation of products, such as drugs and foods.

According to a first aspect of the present invention, a magnetizable chemical composition is provided comprising:
at least one polar solvent selected from the group comprising an alcohol with a number of carbon atoms from $C_8$ to $C_{14}$, polytetrahydrofuran or a mixture thereof;
a ferromagnetic component, including a plurality of magnetizable particles of Stable Single Domain (SSD) type selected from the group comprising magnetite, substituted magnetite and/or ferrite in an amount from 5 to 15% by volume of solvent and having a diameter from about 20 nm to 50 nm; and a polymer component including PVB or PVB-vinyl alcohol-vinyl acetate copolymer in a percentage from 3 to 15% by volume of solvent, the polymeric component being shaped as a net or mesh and delimiting a plurality of housing cells or zones, in each of which one of the particles is housed immersed in the polar solvent.

Advantageously, if the solvent comprises an alcohol with a number of carbon atoms from $C_8$ to $C_{14}$, the polymeric component is present in a percentage from 8% to 15% by volume of solvent.

Still more advantageously, if the solvent comprises polytetrahydrofuran or a mixture of polytetrahydrofuran and an alcohol with a number of carbon atoms from $C_8$ to $C_{14}$, the polymeric component is present in a percentage from 3% to 7% by volume of solvent.

According to another aspect of the present invention, a method is provided for obtaining a composition according to the present invention, comprising the following steps in sequence:

mixing the at least one polar solvent and the polymeric component, thereby obtaining a mixture, and mixing the ferromagnetic component with the mixture until a uniform fluid is obtained.

According to another aspect of the present invention, a microcapsule of a composition is provided according to the present invention.

According to a further aspect of the present invention, an ink comprising a plurality of microcapsules is provided according to the present invention.

According to another aspect of the present invention, a method for testing or analyzing of a product is provided, which comprises the following steps:

providing an ink according to the present invention;
printing the ink on a packaging of a product;
applying a magnetic field having a specific direction to a composition contained in the ink;
preserving the product;
testing the residual magnetization of the composition, it thereby being possible to determine the maximum temperature reached in the product preserving zone, as well as the time of interruption of the cold chain.

BRIEF DESCRIPTION OF THE DRAWINGS

Further aspects and advantages of the present invention will be clearer from the following detailed description of specific embodiments of a composition and a method, such description made with reference to the set of drawings, in which.

In the accompanying drawings, equivalent or similar parts or components were marked with the same reference numerals.

DESCRIPTION OF PREFERRED EMBODIMENTS

A magnetizable chemical composition according to the present invention comprises:

at least one polar solvent selected from the group comprising an alcohol with a number of carbon atoms from $C_8$ to $C_{14}$, polytetrahydrofuran or a mixture thereof;

a ferromagnetic component, including a plurality of magnetizable particles of Stable Single Domain (SSD) type selected from the group comprising magnetite, substituted magnetite and/or ferrite in an amount from 5 to 15% by volume of solvent, preferably 10% by volume of solvent; the particles preferably having a diameter from about 20 nm to 50 nm; with ferromagnetic component percentages being lower than 5%, the magnetic charge would be too low, whereas with percentages greater than 15% the agglomeration of the particles could take place, which would imply an incomplete magnetization; and a polymer component including PVB or PVB-vinyl alcohol-vinyl acetate copolymer in a percentage from 3 to 15% by volume of solvent.

As explained in the above identified international application PCT/IB2010/055254, SSD particles are stable particles made of ferromagnetic material, which are magnetized by means of exposure to an external magnetic field; even after removal of the external magnetic field, such particles have a remanence (of magnetization). The process of demagnetization of SSD particles is conducted very slowly, since such particles can remain magnetized for billions of years. The demagnetization time mainly depends on the intensity of the Brownian motions of the particles due to temperature variations. The demagnetization time also depends on the size of the particles of the same ferromagnetic material.

Given a magnetizable chemical suspension obtained from particles of ferromagnetic material with predetermined grain size, the measurement of the demagnetization of the composition depends on the time elapsed starting from its first magnetization and on the temperature variations sustained; preferably it is indicated in percentage terms according to logarithmic law:

$$X_{RF} = A * \log(b * t)$$

where $\underline{b}$ is a parameter that can be estimated beforehand, $\underline{t}$ is the time in minutes and A varies with the temperature in the same manner in which the viscosity of the employed solvent varies with the temperature.

With a composition according to the present invention, it is possible to overcome the abovementioned problems tied to the pasty appearance, particularly due to the presence of polyvinyl butyral or PVB (or PVB-vinyl alcohol-vinyl acetate copolymer), e.g. the compound Sigma Aldrich® prod. no. 418412, unlike the composition according to the international application PCT/IB2010/055254 which comprises PVP (or PVP-PS copolymer).

The magnetizable chemical composition according to the present invention can be advantageously used for testing the exceeding of the threshold temperatures Ts of freezing or refrigeration for products to be monitored, such as foods or drugs. Therefore, the composition must comprise a fluid part having a freezing point in proximity to the threshold temperatures. Advantageously, the composition according to the present invention has a freezing temperature from −20° C. to +40° C., such range thus being extended to frozen foods as well as drugs which can be preserved at room temperature.

The polymeric component PVB in a composition according to the present invention carries out a role similar to the PVP of the composition according to the international application PCT/IB2010/055254, but in an improved manner, as will be discussed below.

As is stated in such international application, the "net" structure of the polymeric component prevents the SSD particles from being agglomerated due to the Van der Waals attractions and ensures that the particles remain substantially uniformly distributed in the solvent and separated from each other, but at the same time they can be subjected to the effect of an external magnetic field applied thereto. By applying a magnetic field, the particles are magnetized and aligned in the direction of the external magnetic field applied thereto. When substantial temperature variations occur, the particles are moved out of alignment with respect to the magnetic field.

The function of the polymeric component is to separate the ferromagnetic component particles, whereas in the absence of the same component, the particles, following the application of the external magnetic field, tend to be grouped together due to their residual magnetization. The composition according to the present invention is stable even after several years. With regard to the pre-logarithmic demagnetization constant, this can be represented by a formula similar to that indicated in the international application PCT/IB2010/055254. The appearance of one such composition, moreover, is not pasty, but has fluid properties similar to those of an oil. It also has a considerable capacity to be separated into droplets when it is stirred in the presence of water.

Figure 1:
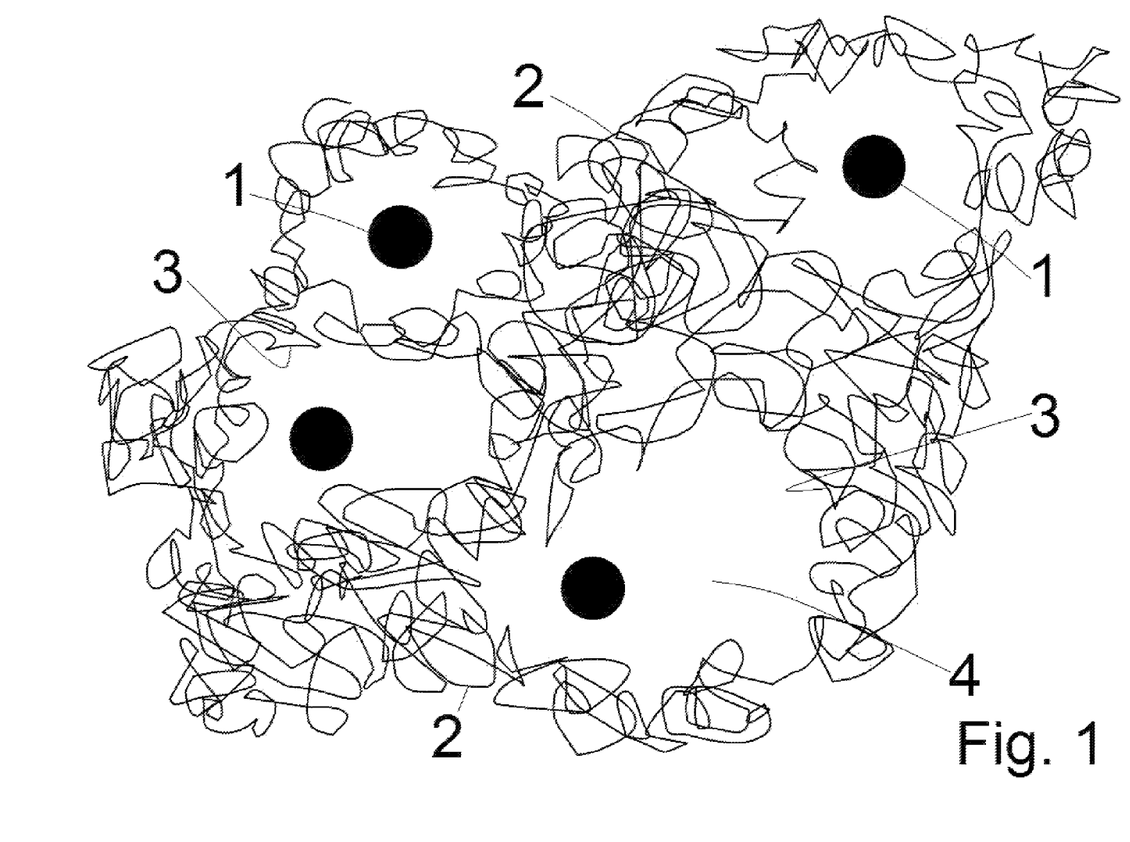
FIG. 1 is a schematic representation in very enlarged scale of a composition according to the present invention.

As illustrated in FIG. 1, in a composition according to the present invention the PVB or PVB-vinyl alcohol-vinyl acetate copolymer 2 is shaped as a net or mesh and delimits and separates a plurality of housing cells or zones 3, in each of which a particle 1 is housed immersed in the solvent 4.

In addition to the abovementioned components, a composition according to the present invention can also comprise reduced quantities, typically less than 2% by weight, of a hydrophobic pyrogenic or fumed silica 5 (e.g. the compound Aerosil R812® produced by Evonik Industries), particularly advantageous for grounds that will be discussed below.

As described in the international application PCT/IB2010/055254, the SSD particles are magnetizable when a magnetic field is applied thereto and they are demagnetized due to Brownian motions. Therefore, due to the presence of the polymer 2, they are not aggregated together and thus they maintain their magnetic properties.

Figure 2:
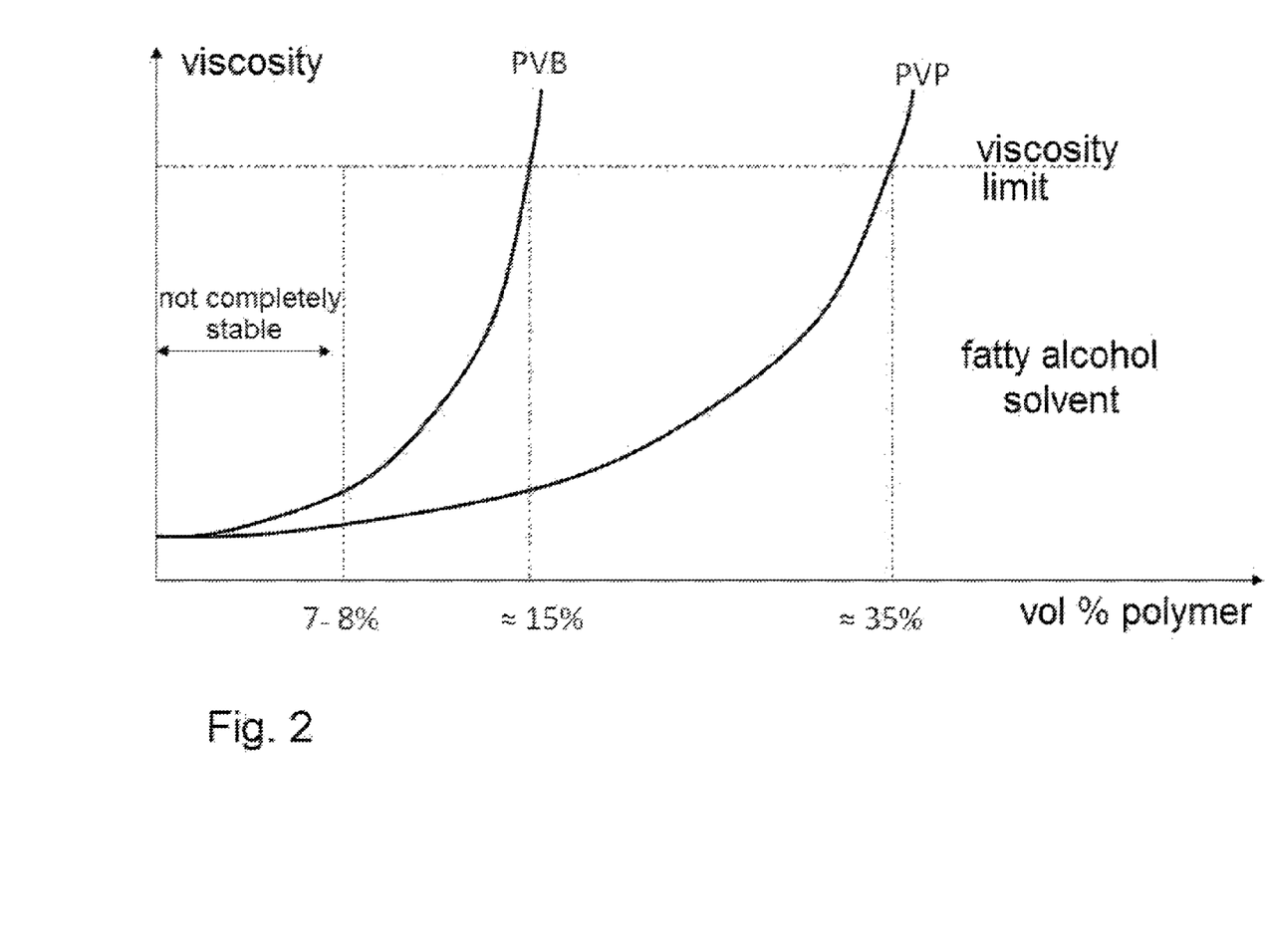
FIG. 2 shows a diagram which illustrates the viscosity of a composition according to the present invention and of a composition which differs from the latter due to the type of polymer.

The viscosity of the composition with PVB (composition according to the present invention) is greater than a composition with PVP (see FIG. 2), particularly when the percentage of the polymer (PVB or PVP) is greater than 13%-15%, but allows obtaining an optimal stability (nearly constant "a"), as will be described below, even with percentages of PVB less than 15%, and preferably equal to 7%-8%. Hence, with a composition as specified above including PVB in percentages lower than 15%, a composition is obtained that is both stable and emulsifiable.

For such purpose, it is noted that the viscosity of the composition affects the ease of emulsifying the same, and more particularly the lower the viscosity the easier it is to emulsify the composition into droplets; such droplets must preferably have dimensions from 1 micron to 100 micron, still more preferably about 20 micron, and regular (spherical) shape.

This is naturally important where, as will be stated below, the composition must be microencapsulated. In such case, a "viscosity/emulsifiability limit" can be defined, above which it is impossible or it is very difficult to emulsify the respective composition and which as physical characteristics corresponds to that which has a mixture of fatty alcohol (between $C_8$ and $C_{14}$) with about 15% of PVB.

With percentages of PVB below 7-8% by volume of solvent, a magnetic suspension according to the present invention is not completely stable, whereas from 8% to 15% a suspension is obtained that is both stable and emulsifiable.

Figure 3:
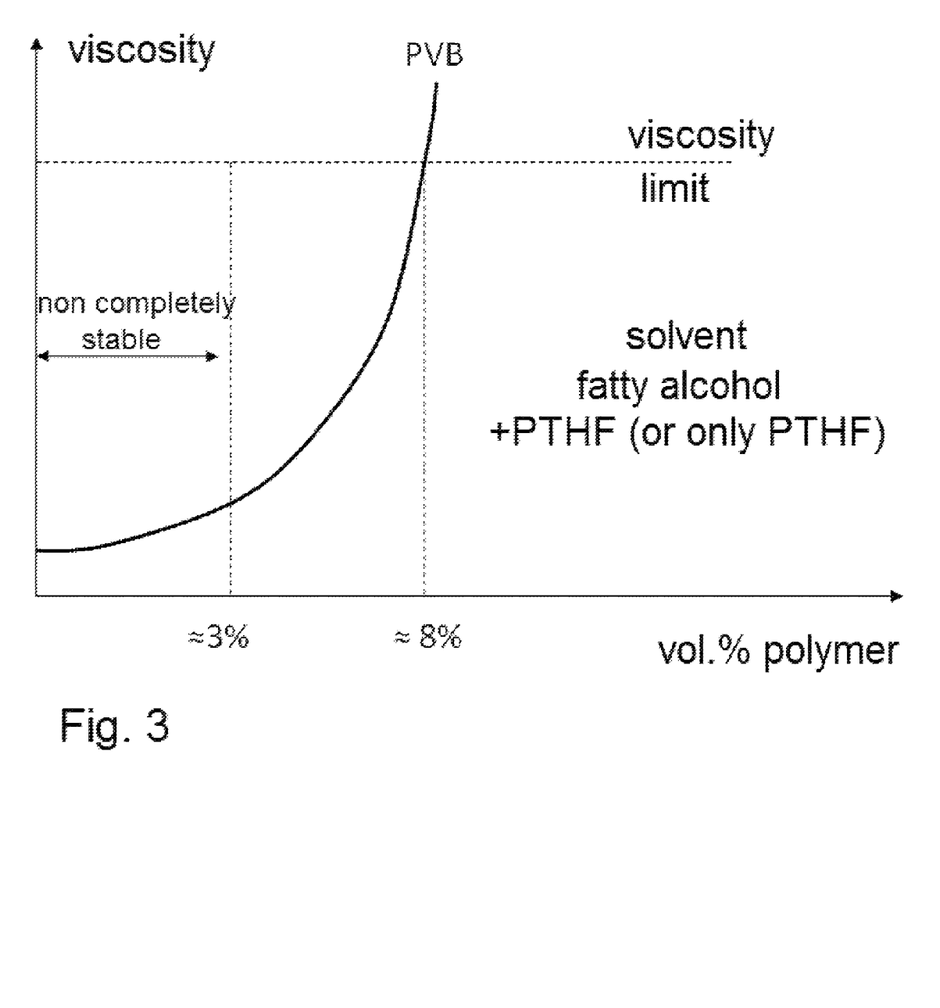
FIG. 3 shows a diagram which illustrates the viscosity of a composition according to the present invention.

If instead PVB+fatty alcohol+Polytetrahydrofuran (PTHF) or PVB+Polytetrahydrofuran (PTHF) is used, then in order to obtain an easily emulsifiable composition according to the present invention the PVB will be present, preferably 3%-7%, always expressed by volume with respect to that of the solvent (see FIG. 3).

Between PVP (polymer present in a composition according to the international application PCT/IB2010/055254) and magnetite, friction interactions can be developed, which does not occur between magnetite and PVB. More particularly, the applicant of the present patent application has conducted tests on the composition of the international application PCT/IB2010/055254 and has experimentally observed that the sensitivity (identified by the value of the pre-logarithmic parameter "a") is inversely proportional to the PVP content in the composition. Therefore, it is deemed that the PVP chains are able in some manner to stop or limit the Brownian motion of the particles due to a form of friction, since the particles themselves lie on the surface.

For example, for a $Fe_3O_4$-octanol-PVP mixture, the parameter "$\underline{a}$" is equal to about 0.36 if [PVP]=15% Vol, $\underline{a}$=0.27 if [PVP]=20% Vol and $\underline{a}$=0.22 if [PVP]=35% Vol. In the case of a composition according to the present invention, including PVB among other substances, the parameter "$\underline{a}$" instead falls in a very slight manner for a PVB concentration range from 8% to 25% by volume with respect to that of the solvent. In the opinion of the applicant of the present patent application, this implies that the SSD magnetic particles are in physical contact mainly only with the solvent, independent of the concentration of the polymer. Hence, it is deemed that the PVB gives rise to the formation of nanocells, in which the magnetic particles are free to move since they are only surrounded by the solvent, but are separated from each other due to the PVB, which therefore prevents the agglomeration of the SSD particles. On this matter, see the schematization of FIG. 1.

Figure 4A:
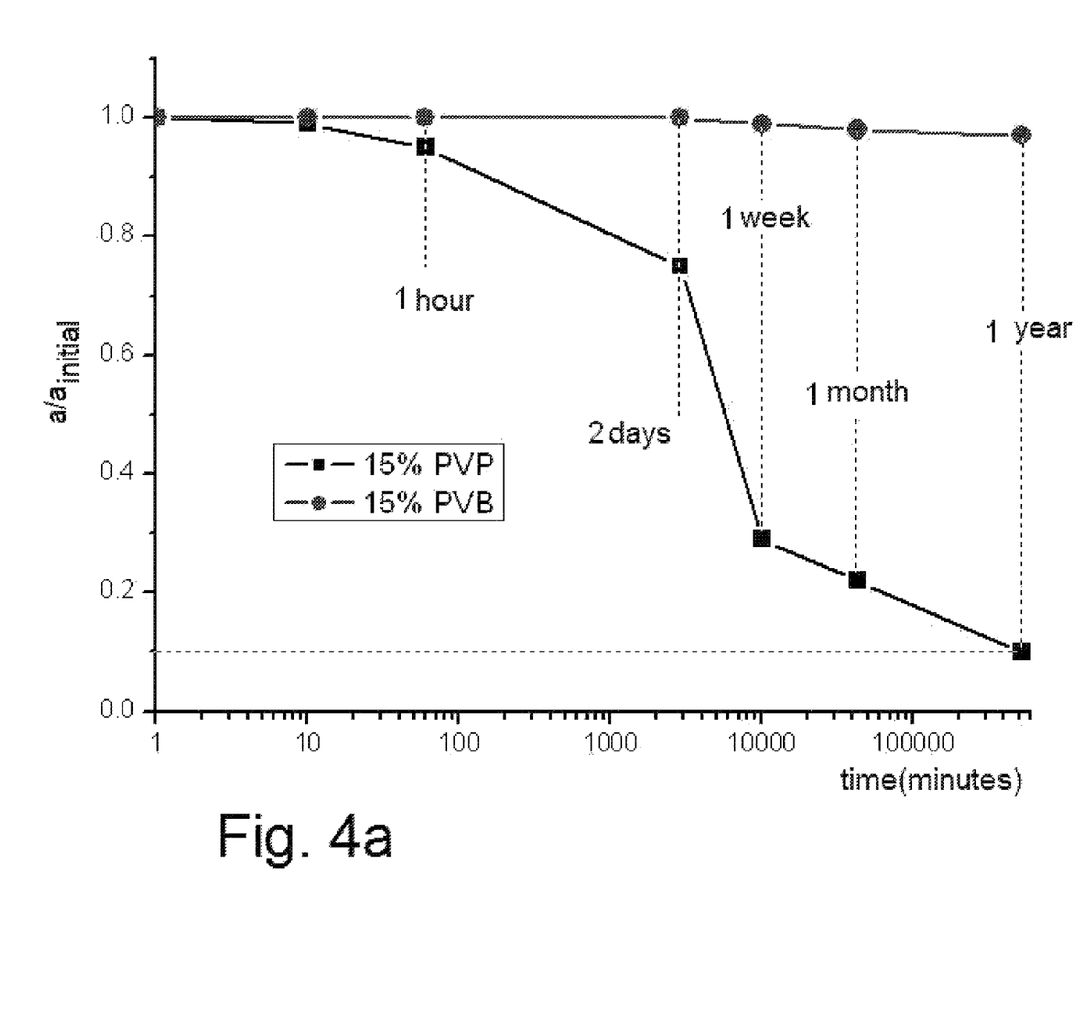
FIGS. 4a and 4b show diagrams which illustrate the sensitivity ("a") as a function of time of compositions according to the present invention and of compositions which differ from the latter due to the type of polymer.
Figure 4B:
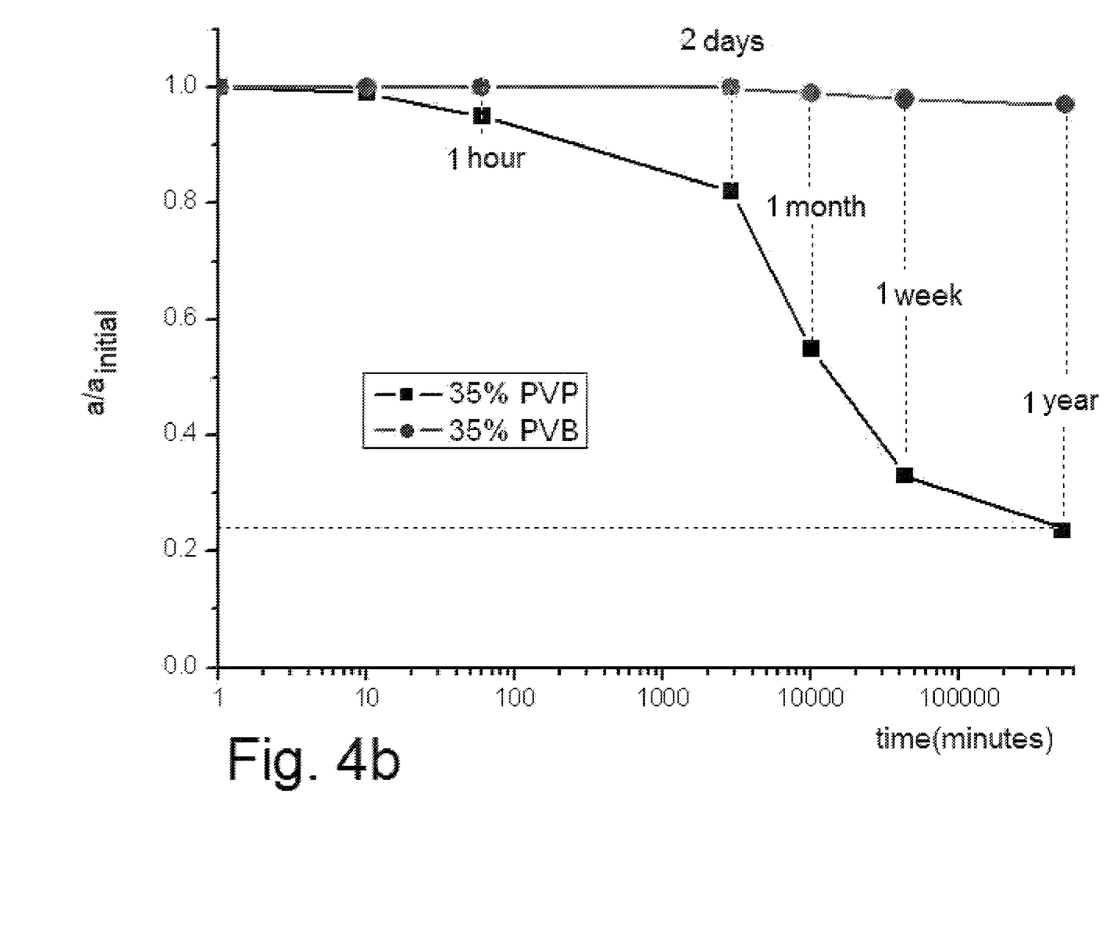

Illustrated in FIGS. 4a and 4b are the drops of sensitivity ("a") over time of a composition according to the present invention and that of a composition that is similar but in which PVP is used as polymer. In both comparisons, the respective polymers are present in the same amount: respectively 15% and 35% by volume of solvent. The SSD particles are particles of magnetite present in an amount of 10% by volume of solvent.

The drop of sensitivity is expressed as $a/a_{initial}$, where $a_{initial}$ is the sensitivity of the composition just prepared. From the diagrams of FIGS. 4a and 4b, it can be inferred that the composition having PVB as polymer (composition according to the present invention) is more stable than a composition with PVP.

Furthermore, the PVP is hydrophilic, and when the respective composition must be microencapsulated, a partial dispersion is obtained of the magnetic suspension or composition in the aqueous phase during emulsification. In addition to decreasing the yield of the microencapsulation process (i.e. ratio between the weight of the emulsified composition and that encapsulated×100), this can lead to a fairly significant non-uniformity between microcapsules, such as the presence of capsules containing only solvent and others containing clusters of SSD nanoparticles. The phenomenon can be partly mitigated by working at low temperature but in certain methods (like microencapsulation via coacervation in gelatin) this is strongly limiting.

Figure 5:
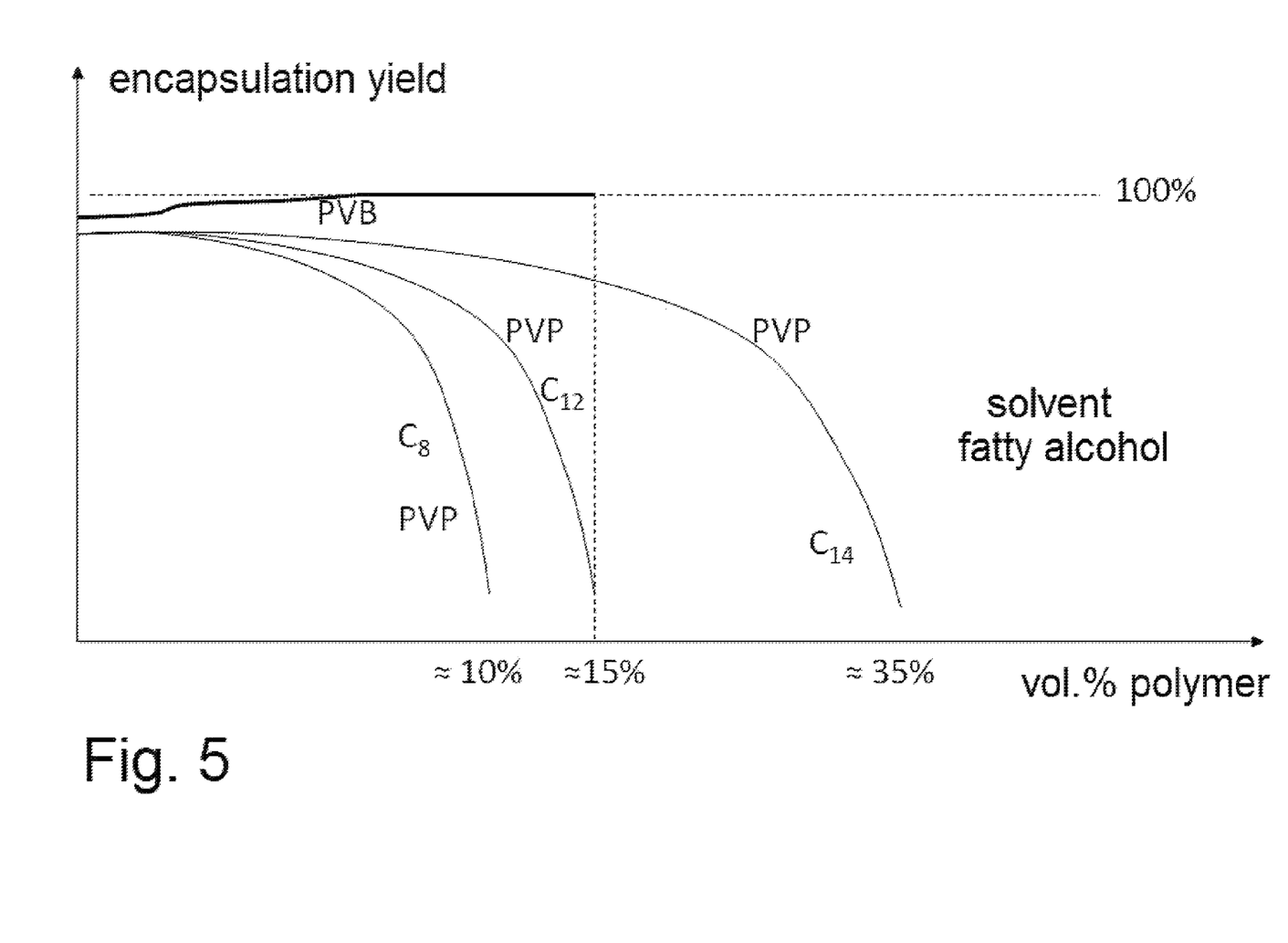
FIG. 5 shows a diagram which illustrates the encapsulation yield of a composition according to the present invention and of compositions which differ from the latter due to the type of polymer.

The percentage of usable PVP increases with the increase of the number of carbon atoms of the solvent, since with the increase of the number of carbon atoms the solvent has a greater total hydrophobicity, but the yield of the microencapsulation using PVB is always greater, if PVB of less than 15% by volume is used (see also FIG. 5).

Hereinbelow, the results are described of several procedures conducted by the applicant of the present patent application, for obtaining a composition according to the present invention.

EXAMPLE 1

6 mL of octanol and 4 mL of decanol were mixed together. The mixture was heated to about 90° C. and 1.15 grams of PVB were dissolved therein by mechanical stirring, Subsequently, after the cooling of the mixture to about 20° C., 4.6 grams of cobalt ferrite $CoFe_2O_4$ were added and mixed, with a diameter from 35 nm to 50 nm (SD) as declared by the producer. Then, 0.17 grams of Aerosil R812® were added and mixed under cold conditions. The resulting composition is adapted for obtaining a senor, we will be stated below, capable of detecting if a product has been maintained at temperatures greater than −18° C.

EXAMPLE 2

1.15 grams of PVB were dissolved via mechanical stirring in 10 mL of dodecanol at 90° C. Subsequently, after cooling the mixture to about 20° C., 4.6 grams of cobalt ferrite $CoFe_2O_4$ were added and mixed, with a diameter from 35 nm to 50 nm (SD) as declared by the producer. The resulting composition is adapted for obtaining a sensor capable of detecting if a product has been maintained at a temperature greater than +21° C.

EXAMPLE 3

1.15 grams of PVB were dissolved via mechanical stirring in a mixture at 90° C. composed of 6 mL of decanol and 4 mL of dodecanol. Subsequently, after the cooling of the mixture to about 20° C., 4.6 grams of cobalt ferrite $CoFe_2O_4$ were added and mixed, with a diameter from 35 nm to 50 nm (SD) as declared by the producer. The resulting composition is adapted for obtaining a sensor capable of detecting if a product has exceeded +8° C.

EXAMPLE 4

0.95 grams of PVB were dissolved via mechanical stirring in a mixture at 90° C. composed of 5 mL of dodecanol and 5 mL of poly(tetrahydrofuran) (Sigma Aldrich prod. No. 345288, alternative name: Terathane® 650 polyether glycol, with molecular weight equal to about 650). Subsequently, after the cooling of the mixture to about 20° C., 4.9 grams of cobalt ferrite $CoFe_2O_4$ were added and mixed, with a diameter from 35 nm to 50 nm (SD) as declared by the producer. The resulting composition is adapted for obtaining a sensor capable of calculating if a product, such as milk or refrigerated meat (not frozen), is to be considered safe for the consumer, i.e., if the product has been preserved or not preserved at temperatures lower or greater than respective threshold temperatures.

EXAMPLE 5

1.15 grams of PVB were dissolved via mechanical stirring in 10 mL of tetradecanol at 90° C. Subsequently, after the cooling of the mixture to about 20° C., 4.6 grams of cobalt ferrite $CoFe_2O_4$ were added thereto and mixed, such cobalt ferrite having a diameter from 35 nm to 50 nm (SD) as declared by the producer. The resulting composition is suitable for obtaining a sensor capable of detecting if a product has exceeded +35° C.

EXAMPLE 6

0.14 grams of PVB were dissolved via mechanical stirring in a mixture at 90° C. composed of 1.5 mL of poly (tetrahydrofuran) with molecular mass about equal to 650 and 0.5 mL of poly(tetrahydrofuran) with molecular mass equal to about 2900. Subsequently, after the cooling of the mixture to about 20° C., 0.86 grams of cobalt ferrite $CoFe_2O_4$ were added and mixed, with a diameter from 35 nm to 50 nm (SD) as declared by the producer. The resulting composition is suitable for obtaining a sensor capable of calculating if a product, such as milk or refrigerated meat (not frozen), is to be considered safe for the consumer in the sense indicated above. Unlike the composition of Example 4, a composition obtained as described presently is not completely demagnetized if the temperature does not reach 35° C. - 40° C.; this is particularly useful in order to know if the maximum temperature, at which the product has been subjected, is greater than 35° C.-40° C. Typically, if such temperature is not exceeded, the demagnetization does not exceed about 70%. Hence, by evaluating the degree of demagnetization of a composition obtained as in Example 6, it is possible to establish if the composition has also been subjected to a temperature greater than 35° C.-40° C.

EXAMPLE 7

1.15 grams of PVB were dissolved via mechanical stirring in a mixture at 90° C. composed of 4 mL of octanol and 6 mL of poly(tetrahydrofuran) with molecular weight equal to about 250. Subsequently, after the cooling of the mixture to about 20° C., 4.9 grams of cobalt ferrite $CoFe_2O_4$ were added and mixed, with a diameter from 35 nm to 50 nm (SD) as declared by the producer. The resulting composition is adapted for obtaining a sensor capable of testing the safety of several drugs to be preserved frozen.

Furthermore, it is specified that in a composition according to the present invention, the ferromagnetic component is arranged separately and hence added afterward to the other components, as stated above, more particularly to the polar solvent and to the polymeric component of the composition.

A composition according to the present invention can be microencapsulated and mixed with commercial inks (e.g. Sun Chemical NTC 9603) in order to obtain a thermosensitive ink, using the same method taught in the international application PCT/IB2010/055254.

The microencapsulation can be obtained through mechanical or chemical methods.

The chemical methods are mainly based on a process of interfacial polymerization, where the interface is that between the emulsion solvent, typically water and wall-forming polymer, and the magnetizable suspension droplets. Such methods in any case occur in emulsion under constant stirring.

As will be understood, in order to obtain the microencapsulation, the solvent, the material which will form the walls of the capsule, and the material of the core must be substantially insoluble with respect to each other.

Figure 6:
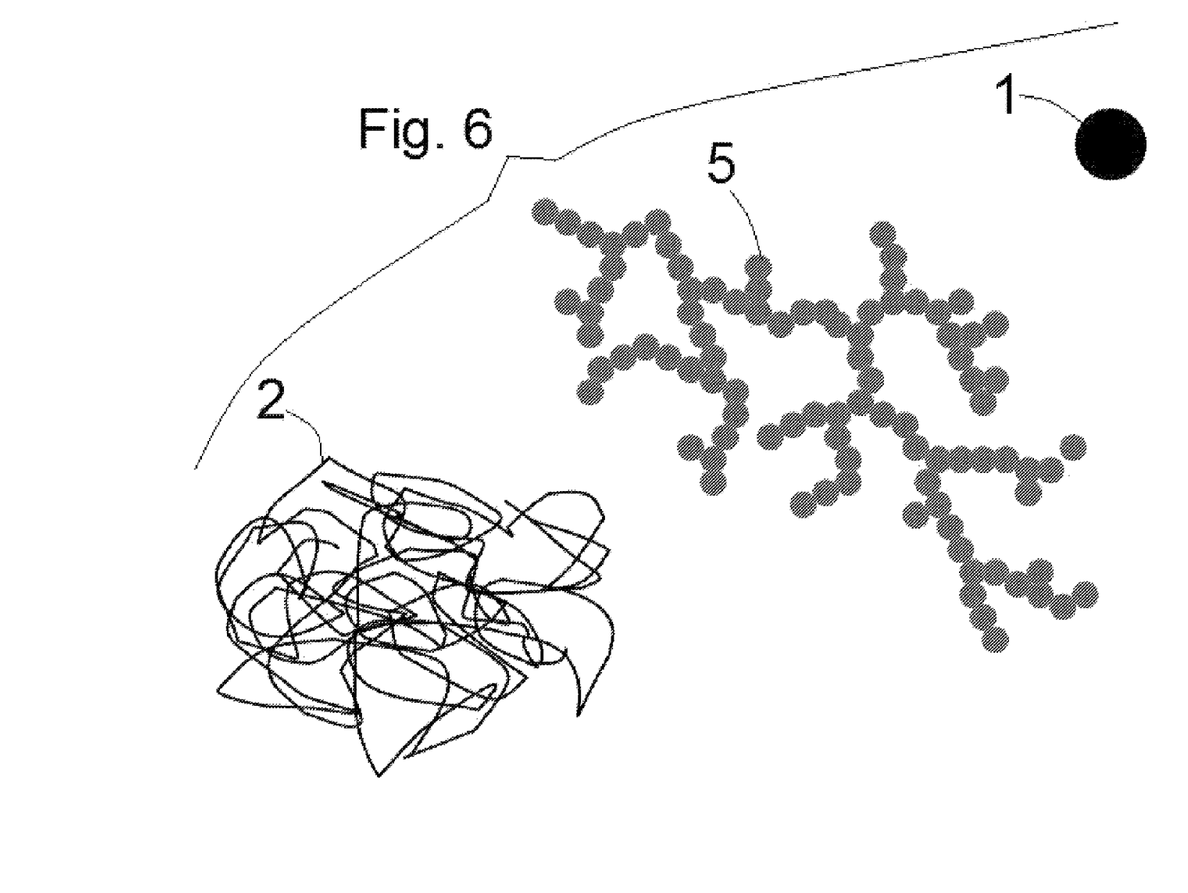
FIG. 6 illustrates three separate components which can be provided for in a composition according to the present invention.
Figure 7:
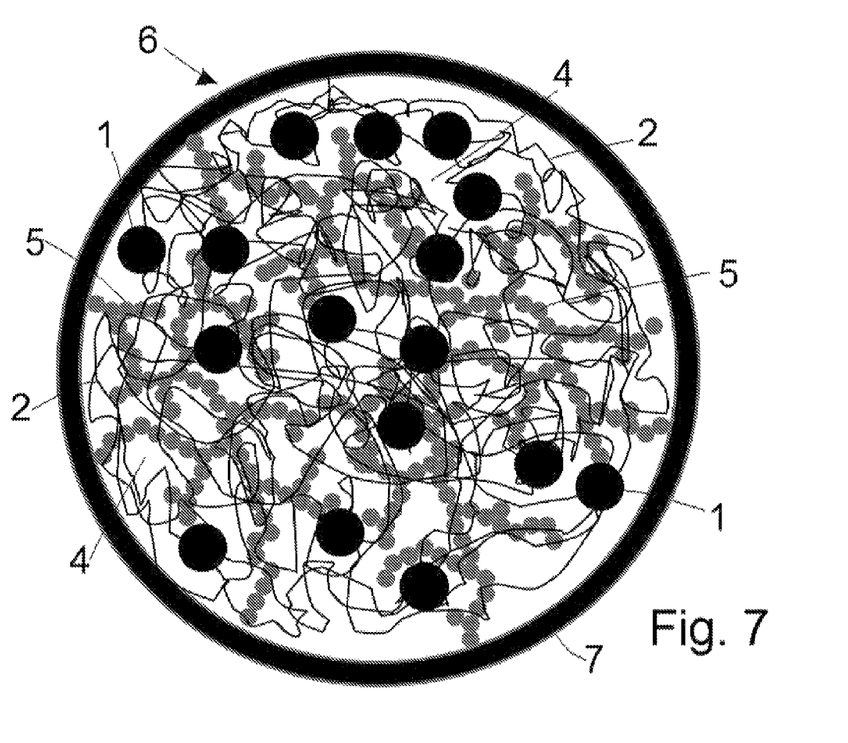
FIG. 7 is a schematic representation with parts transparent of a microcapsule according to the present invention.

FIG. 7 illustrates a microcapsule 6 obtained starting from a composition according to the present invention (whose separated components are illustrated in FIG. 6, apart from the solvent, naturally), from which it is inferred that the pyrogenic silica 5 (Aerosil R812) acts as rigid "scaffolding" or "framework" of support for the polymeric chains of PVB. The shell or containment wall 7 of the capsule can typically consist of gelatin or isocyanates or melamine-formaldehyde resin or phenolic resin.

The composition that is the subject matter of the present invention has considerable advantages, both regarding obtainability and reliability of the sensor obtained, by making use of an ink base including a microencapsulated composition according to the present invention.

It must be recalled that PVB is completely hydrophobic (unlike PVP). Hence, if a composition according to the present invention is microencapsulated, a microencapsulation yield is obtained (i.e. weight of product/weight of the employed composition) equal to nearly 100%.

It was verified that the advantages derived from the use of PVB are not only connected to its greater hydrophobicity with respect to PVP (which is polar hydrosoluble), and, with regard to that, the applicant of the present patent application has observed that, by substituting, in the composition disclosed in the international application PCT/IB2010/055254, the PVP graft tryacontene (for example the compound Sigma Aldrich® Poly(1-vinylpyrrolidone)graft-(1-tryacontene)), such a composition does not undergo demagnetization due to the brownian motions above the threshold temperature.

This is due to the fact that PVP graft tryacontene, which is a polymer having a waxy aspect, crystallizes as a plurality of nano-fibrils once it is dissolved at hot temperature in the solvent, the nano-fibrils interacting with the magnetic particles, thereby actually blocking them in position, and improving the difficulty of dispersing the magnetic particles in the complex solvent/polymer by using both mechanical means (homogenizers) and ultrasonic techniques (ultra-sonification).

In the case of relatively large SSD nanoparticles (from 50 nm to 100 nm, but still SD), it is convenient to add a small amount, less than 2% by weight, of pyrogenic silica solvent, which acts as a rigid framework or scaffolding in the microcapsule, as is particularly visible in FIG. 7, for the PVB net, preventing the collapse via gravity thereof, as well as the precipitation of the suspension.

If for example the microcapsules containing the composition of Example 3 are mixed with those containing the composition of Example 5 in 2:4 proportion, it is possible to understand if +35° C. has been exceeded, even for a reasonably brief time period, by testing if the demagnetization deriving from the interruption of the cold chain is greater than 33%: if it is not, 4 parts of 6 of the microcapsules cannot be demagnetized if the temperature is less than 35° C.

The ability to establish if a second temperature has also been exceeded (i.e. if the product was maintained at a second temperature, greater and different from the threshold temperature) constitutes a considerably advantage (in addition to the possibility of having a digital output) with respect to the thermochromic labels.

Advantageously, in a composition according to the present invention, $CoFe_2O_4$ is used instead of $Fe_3O_4$, since the latter is oxidized, due to the oxygen present in the atmosphere, to $Fe_2O_3$. The walls of the microcapsules and the protective action of the fatty alcohols are able to protect the $Fe_3O_4$ only for a few months. $CoFe_2O_4$ also has a greater remanence (Bres) than $Fe_3O_4$ and hence allows obtaining the sensor with a lower amount of ink, allowing the obtainment of a higher aesthetic and practical value for the sensor.

A microencapsulated composition according to the present invention can be used for obtaining a sensor element, for example an ink printable (preferably in the form of a dash) on a package or the like, due to which it is possible to establish if the packaged product has been maintained at a temperature greater than TTH and TUP. Each improvement with regard to encapsulatability (low viscosity, total hydrophobicity, low tendency of the solvent to evaporate) therefore represents a great advantage.

In order to obtain one such sensor, the microencapsulated composition can be mixed with an ink. Preferably, the composition of the ink comprises a solvent selected from the group comprising water, oil, alcohols, ethyl acetate, a pigment, a resin selected from the group comprising nitrocellulose, resin acrylic, vinyl, maleic, fumaric, ketonic, polyurethane, polyamide.

The present invention also therefore aims at providing a sensor that is practical, inexpensive and which meets the needs of the market. Particularly, for most of the products, stability studies are conducted up to a higher temperature (TUP). For example, some drugs for treating hemophilia are stable for a week, if the maximum temperature does not exceed +35° C., when the recommended preservation temperature ranges from +2° C. to +8° C. From this standpoint, it is very important to know not only if +8° C. was exceeded, but also if the product was kept above +35° C. for a greater or lesser period. As stated above, this can be obtained by mixing the microcapsules containing the composition of Example 3 with others containing the composition described in the following Example 5.

With regard to the solvent of a composition according to the present invention, poly(tetrahydrofuran) can be used, or this component can be used in combination with a fatty alcohol. The use of the poly(tetrahydrofuran) has several very important advantages:

it allows stabilizing the magnetic composition with lower percentages of PVB, even less than 5.5%, to the benefit of the emulsifiability;

it allows reducing the viscosity by simply heating the composition to a greater extent than a composition comprising fatty alcohols as solvent and PVB as polymer: therefore, if a composition according to the present invention comprising poly(tetrahydrofuran) results too viscous to be emulsified, it would be possible to render it more fluid by simply heating it, typically to 50° C.÷ 60° C.;

experimentally, it is observed that in emulsion it does not dirty the walls of the receptacle where the encapsulation occurs: the yield is therefore higher and the maintenance (cleaning) of the equipment quicker.

it does not evaporate: fatty alcohols such as octanol, decanol, dodecanol have the tendency to evaporate (at the liquid state) and to pass through the walls of the microcapsules, especially if they are made of gelatin: the consequence thereof is the drying of the encapsulated composition, which will no longer be able to be demagnetized by Brownian mechanism;

with respect to the fatty alcohols (especially octanol and decanol), it does not require particular caution non in being handled;

it allows slowing the demagnetization speed by increasing the viscosity of the solvent if the sensor resulted too sensitive for a given application;

the fatty alcohols have a very defined melting point, whereas poly(tetrahydrofuran) melts in a rather wide temperature range, passing from a waxy solid to a "molasses liquid": if the object is to have a quick demagnetization at a very precise temperature, the composition will have a higher fatty alcohol content, whereas if a progressive demagnetization is desired, dependent on the temperature, it is convenient to use a composition with higher poly(tetrahydrofuran) content.

Figure 8A:
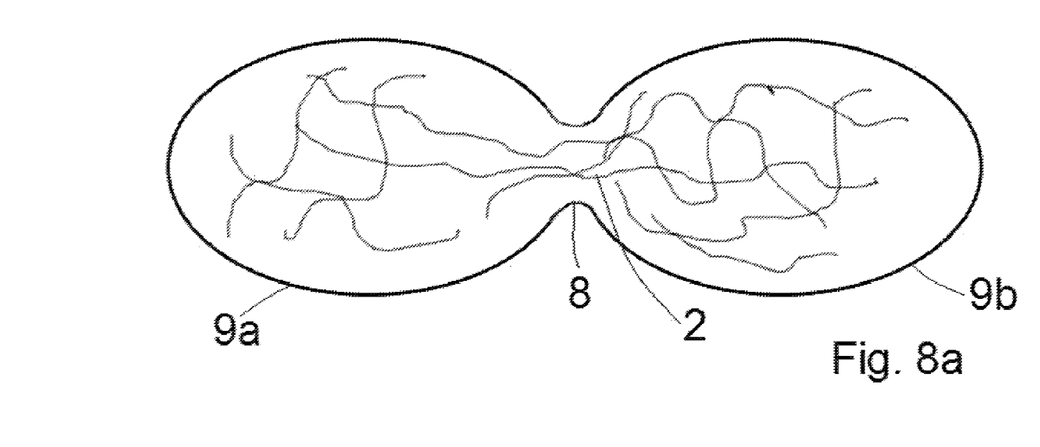
FIGS. 8a and 8b are schematic representations of a drop that is separated, following emulsification, into smaller drops; more particularly, FIG. 8b regards a composition with more dissolved polymer, which will be emulsified with more difficulty.
Figure 8B:
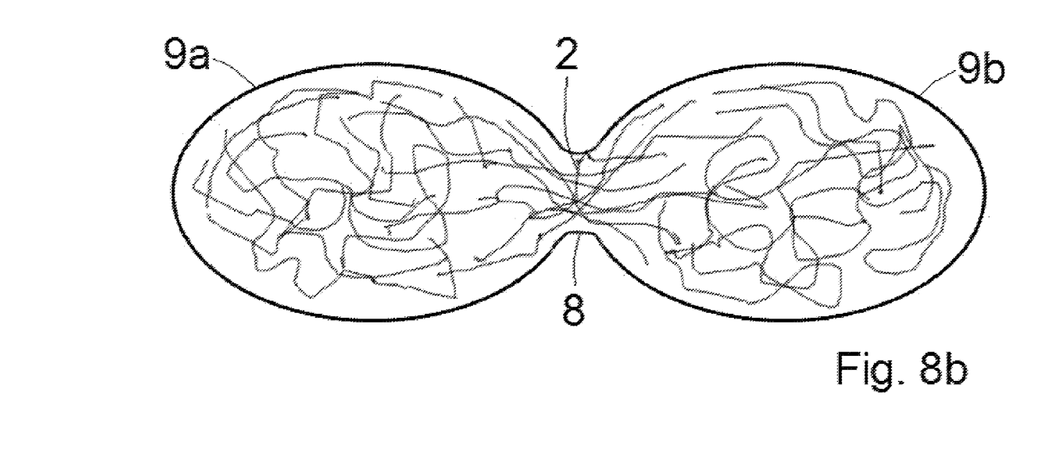

With regard to the slowing of the demagnetization speed and the increase of the viscosity of the solvent due to the presence of poly(tetrahydrofuran) or PTHF, it should be noted that in order to reduce the demagnetization speed if the sensor resulted too sensitive for a given application, the best strategy is surely that of increasing the viscosity of the solvent. Such increase is usually obtained by increasing the content of dissolved polymer (in this case PVB), hence it is possible that the emulsifiability of the magnetic suspension is excessively reduced. Indeed, the separation of one drop into smaller drops can be difficult in the presence of a large number of polymeric chains (FIG. 8b) which must slide in a viscous manner in the bridge or "collar" portion 8 that separates two droplets 9a and 9b about to be separated (see FIGS. 8a and 8b): in light thereof, the content of dissolved polymer should be kept as low as possible (FIG. 8a). The applicant of the present patent application has verified that, with the addition of poly-tetrahydrofuran with molecular weight typically from 250 to 2900 to a fatty alcohol (or to a mixture of fatty alcohols), an increase of viscosity can be obtained simultaneously with an optimal emulsifiability due to a satisfactory viscous sliding.

More particularly, the increase of viscosity obtainable by using the PVB on a fatty alcohol (or on a mixture of fatty alcohols) can be much greater if poly-tetrahydrofuran is also present, typically in percentages from 20% to 80% by volume with respect to the total solvent volume. The applicant of the present patent application deems that this is probably due to the fact that the PVB has experimentally proven to be an optimal gelling agent for the poly-tetrahydrofuran, which therefore allows obtaining high viscosities even in the presence of limited polymer quantities.

By using fatty alcohol-polytetrahydrofuran plus PVB mixtures in the above-indicated proportions (e.g. mixtures with 50%-50% fatty alcohol-polytetrahydrofuran and PVB at 6%), viscosities can be obtained that are typical of compositions obtained with fatty alcohols and PVB at 35% (always expressed by volume with respect to that of the solvent), but emulsifiabilities can be obtained that are much greater than these.

In order to improve the wettability of a mixture comprising fatty alcohols, PTHF and PVB (although the same is much less viscous than a mixture made of PVP), it is possible to use a fatty acid, which is a means wherein the aforesaid nanoparticles (e.g. 35 gr. of $CoFe_2O_4$ in 35 grams of oleic acid at 28000 revolutions/min) can be very easily dispersed.

According to a variation of the present invention, the nanoparticles are wet by pre-dispersing them in a fatty acid, for example, oleic, linoleic, linolenic or myristic acid and are then joined to mixtures of fatty alcohol plus PVB or PTHF plus PVB. Preferably, the nanoparticles and the fatty acid are mixed in a 1:1 ratio by weight.

The applicant of the present patent application has conducted some tests of pre-dispersion of nanoparticles with a fatty acid, the data of some of them being reported herein below:

sample 1: dispersion of 50 grams of $CoFe_2O_4$ in 53.4 grams of oleic acid and subsequent addition of a mixture of 115 grams of PHTF and 6.5 grams of PVB; and sample 2: dispersion of 2.3 grams of $CoFe_2O_4$ in 2.254 grams of oleic acid and subsequent addition of a mixture of 115 grams of PHTF and 6.5 grams of PVB. Such mixtures have proved to be highly emulsifiable and thus quite suitable for the production of very thin microcapsules.

Figure 9:
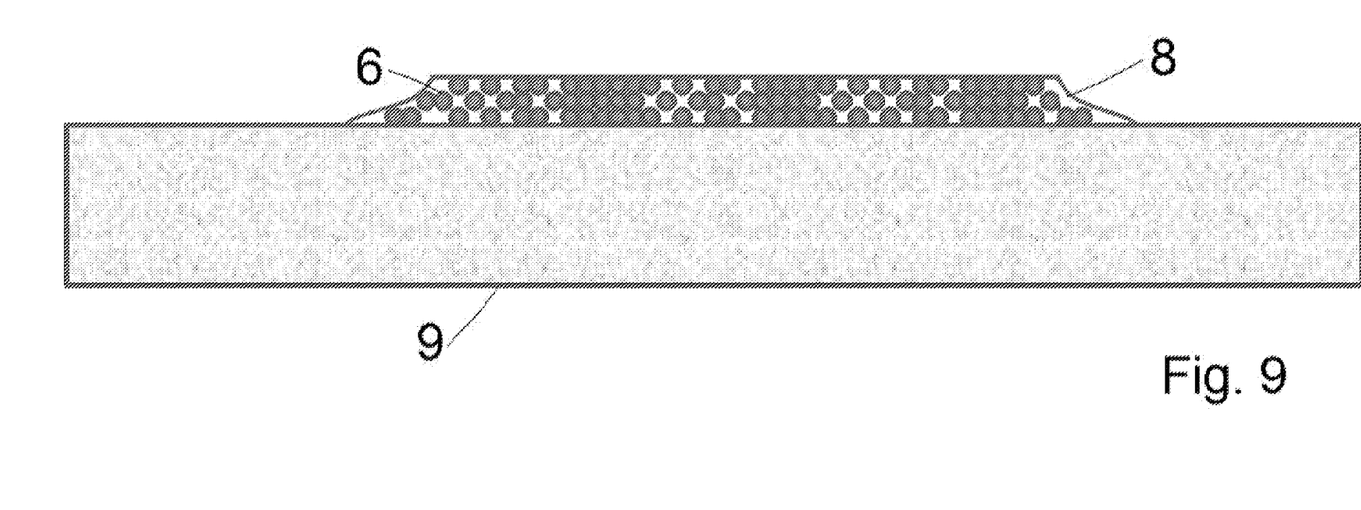
FIG. 9 illustrates an ink according to the present invention applied on a support.

With reference to FIG. 9, a sensor 8 is illustrated in cross-section according to the present invention. Such sensor is obtained by printing a dash (preferably 3 mm×8 mm) with a thermo-sensitive ink obtained by mixing the microcapsules containing the magnetic suspension according to the present invention with a "base" for flexographic inks or serigraphic inks with UV crosslinking (e.g. Sun Chemical NTC 9603). The support 9 is typically paper, adhesive paper, cardboard or adhesive PP. The ink can contain capsules also containing multiple compositions according to the present invention.

As will be understood, once an ink is arranged according to the present invention, the ink is printed on a packaging of a product and a magnetic field having a specific direction is applied thereto and hence to the chemical composition contained therein. At this point, the product is preserved. At a later time, by verifying the residual magnetization of the composition it is possible to determine the maximum or minima temperature reached in the preserving zone of the product and hence evaluate if the product has been preserved at the correct temperatures or if the same product, having been preserved at too-high or too-low temperatures, has deteriorated.

As will be understood, during the magnetization testing step, the residual magnetization Bm can be compared with a threshold value BTH which represents a demagnetization corresponding to the transition from safe to unsafe product.

With reference to the composition the subject matter of the international application PCT/IB2010/055254, it was further observed that when the mechanical stirring is carried out in water in order to obtain an emulsion to be encapsulated, the composition with PVB the subject matter of the present application has a much higher yield in terms of used material/usable final product.

In both cases, stirring results in breaking an heterogeneous mixture, which comprises, on one side, liquid and solid components, and on the other side a fraction of non-dispersed magnetite.

The liquid and solid components, while being emulsified in water, could become separated from one another, since the magnetite could be washed away or separated from the solvent/polymer oleic complex due to the absence of any hydrophobic coating thereon, and this would cause the encapsulation of the solvent/polymer, on the one side, and the encapsulation of the magnetic or ferromagnetic component on the other side. The PVP promotes this phenomenon which is obviously undesired; to this regard, the PVP by being hydrosoluble causes, although not in an excessive manner, the solvent to become less hydrophobic, thereby promoting the washout of the magnetite (ferromagnetic component). If PVP graft tryacontene was used, which, just like PVB, can reduce or eliminate the emulsification, washout effect, what is encapsulated does not become demagnetized due to brownian motions, unlike the formulation with PVB.

The portion of magnetite which was not efficiently dispersed comprises clusters of magnetic nuclei which do not undergo demagnetization by the brownian mechanism due to their being aggregated.

Such magnetite clusters do not prevent demagnetization of the composition due to Brownian motions only in the case of a composition comprising PVB. The clusters, as a matter of fact, in the case of the decomposition with PVB, rotate thereby becoming arranged antiparallel with respect to the remnence magnetic field. With PVP, this is impossible, because the clusters are blocked by the excessive pasty consistency of the mixture. Accordingly, PVB, unlike PVP, is suitable for reducing the negative effect of the non-dispersed clusters which do not demagnetize as usual.

Moreover, if a PVP composition (prior art) is microencapsulated, the drops thus obtained would be quite ragged, since the high pasty consistency of the PVP material does not allow them to take a spherical shape. If a composition according to the present invention is encapsulated, the microcapsules would be substantially spherical and this due to the low viscosity of the respective solution.

Of course, spherical microcapsules are more desirable, since they guarantee a higher volume/surface ratio, and thus the capsule/ink mixture will be more fluid in the printing plants, thereby obtaining a higher printability of the sensors (dashes).

Another advantage deriving from the use of PVB instead of PVP is that PVB prevents the solvent from crystallizing by becoming pasty in the long term, if used in combination with polytetrahydrofuran. It was in fact observed that PTHF can become solid after long periods (a few months) if stored at room temperature and in this way brownian demagnetization is prevented. This undesired phenomena is prevented owing to PVB.

In so far as international application PCT/KR2004/003090 is concerned, it does not teach a composition according to the present invention nor, among other things, the use of PVB.

The above-described composition is susceptible to numerous modifications and variations within the protective scope defined by the claims.

What is claimed is:

1. A magnetizable chemical composition comprising:
   at least one polar solvent comprising an alcohol with a number of carbon atoms from $C_8$ to $C_{14}$, polytetrahydrofuran, or a mixture thereof;
   a ferromagnetic component, including a plurality of magnetizable particles of Stable Single Domain (SSD) type comprising magnetite, substituted magnetite and/or ferrite in an amount from 5 to 15% by volume of solvent and having a diameter from about 20 nm to 50 nm; and
   a polymer component including polyvinyl butyral (PVB) or polyvinyl butyral-vinyl alcohol-vinyl acetate copolymer in a percentage from 3 to 15% by volume of solvent, said polymer component being shaped as a net or mesh and delimiting a plurality of housing cells or zones in each of which one of said particles is housed immersed in said polar solvent.

2. A composition according to claim 1, wherein when said solvent comprises an alcohol with a number of carbon atoms from $C_8$ to $C_{14}$, said polymeric component is present in a percentage from 8% to 15% by volume of solvent.

3. A composition according to claim 1, wherein when said solvent comprises polytetrahydrofuran or a mixture of polytetrahydrofuran and an alcohol with a number of carbon atoms from $C_8$ to $C_{14}$, said polymeric component is present in a percentage from 3% to 7% by volume of solvent.

4. A composition according to claim 1, further comprising hydrophobic pyrogenic silica, said hydrophobic pyrogenic silica being present in an amount lower than 2% by weight of solvent.

5. A composition according to claim 1, further comprising a fatty acid.

6. A composition according to claim 5, wherein said fatty acid comprises oleic, linoleic, linolenic or myristic acid.

7. A method of obtaining a composition according to claim 1, comprising the following steps in sequence:
   mixing said at least one polar solvent and said polymer component, thereby obtaining a mixture, and
   mixing said ferromagnetic component with said mixture until a uniform fluid is obtained.

8. A method according to claim 7 of obtaining the composition, said composition further comprising a fatty acid, wherein said ferromagnetic component is wet by being pre-dispersed in said fatty acid, and subsequently mixed with the other components of said composition.

9. A microcapsule of a composition according to claim 1.

10. A microcapsule according to claim 9, further comprising a containment wall made of gelatin or isocyanates or melamine-formaldehyde resin or phenolic resin.

11. An ink comprising a plurality of microcapsules according to claim 9.

12. An ink according to claim 11, further comprising a solvent comprising water, oil, alcohols, ethyl acetate, a pigment and a resin comprising nitrocellulose, acrylic, vinyl, maleic, fumaric, ketonic, polyurethane and polyamide resin.

13. A method of testing or analyzing a product, which comprises the following steps:
   providing an ink comprising a plurality of microcapsules of a composition according to claim 1;
   printing said ink on a packaging of a product;
   applying a magnetic field having a specific direction to a composition according to claim 1 contained in said ink;
   preserving said product;
   testing the residual magnetization of said composition, it thereby being possible to determine the maximum temperature reached in the preserving zone of said product.

14. A method according to claim 13, wherein during said magnetization testing step, the residual magnetization is compared with a threshold value representing a demagnetization corresponding to the transition from safe to unsafe product.

* * * * *